US010423752B2

(12) United States Patent
Call et al.

(10) Patent No.: US 10,423,752 B2
(45) Date of Patent: Sep. 24, 2019

(54) SEMICONDUCTOR PACKAGE METAL SHADOWING CHECKS

(71) Applicant: International Business Machines Corporation, Armonk, NY (US)

(72) Inventors: Anson J. Call, Poughkeepsie, NY (US); Francesco Preda, New Braunfels, TX (US); Paul R. Walling, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 22 days.

(21) Appl. No.: 15/719,743

(22) Filed: Sep. 29, 2017

(65) Prior Publication Data

US 2019/0102506 A1    Apr. 4, 2019

(51) Int. Cl.
*G06F 17/50* (2006.01)

(52) U.S. Cl.
CPC ...... *G06F 17/5081* (2013.01); *G06F 17/5077* (2013.01); *G06F 2217/16* (2013.01); *G06F 2217/38* (2013.01)

(58) Field of Classification Search
USPC ........................................................ 716/112
See application file for complete search history.

(56) References Cited

U.S. PATENT DOCUMENTS

| 6,499,135 | B1 | 12/2002 | Li et al. |
| 6,769,102 | B2 | 7/2004 | Frank et al. |
| 7,689,951 | B2 | 3/2010 | Cazeaux |
| 9,330,222 | B2 | 5/2016 | White et al. |
| 2009/0020784 | A1 | 1/2009 | Araki et al. |
| 2010/0164116 | A1* | 7/2010 | Li .................... H01L 21/76816 257/774 |
| 2015/0213185 | A1 | 7/2015 | Hensel et al. |

OTHER PUBLICATIONS

List of IBM Patents or Patent Applications Treated As Related (Appendix P); Filed Sep. 29, 2017, 2 pages.
Anson J. Call, et al. "Semiconductor Package Via Stack Checking," U.S. Appl. No. 15/719,693, filed Sep. 29, 2017.
Jean Audet, et al. "Semiconductor Package Floating Metal Checks," U.S. Appl. No. 15/719,698, filed Sep. 29, 2017.

* cited by examiner

*Primary Examiner* — Bryce M Aisaka
(74) *Attorney, Agent, or Firm* — Cantor Colburn LLP; Steven Meyers

(57) ABSTRACT

Embodiments of the invention include methods, systems, and computer program products for checking metal coverage in a laminate structure. Aspects of the invention include receiving, by a processor, metal shadowing rules and a semiconductor package design comprising a plurality of laminate layers, a plurality of metal power shapes, and a plurality of signal lines. Each metal power shape is mapped to one or more cells in a two-dimensional array. The processor determines, for each signal line in the semiconductor package design, whether the metal power shapes satisfy the metal shadowing rules. The processor displays a list of signal lines that do not satisfy the metal shadowing rules.

20 Claims, 7 Drawing Sheets

SEMICONDUCTOR PACKAGE METAL SHADOWING CHECKS

BACKGROUND

The present invention generally relates to integrated circuit packaging and design, and more specifically, to methods, systems and computer program products for semiconductor package metal shadowing checks.

Electronic components include electronic devices, such as field programmable gate arrays (FPGAs), application specific integrated circuits (ASICs), and other integrated circuits, supported on a printed circuit board (PCB). These electronic devices are manufactured on semiconductor substrates by sequential processing operations. Multiple electronic devices can be manufactured on a single substrate. These multiple electronic devices on the single substrate are sliced into multiple dies (or chips) after the sequential processing operations are completed and all the devices are formed. Prior to being placed on the PCB, these electronic devices (or dies) are placed in packages to allow the devices to be handled and to be electrically coupled to the PCB. There are vias and interconnects (wires) embedded in multiple substrate layers in packages that provide an electrical network for the die to be electrically coupled to the PCB and to enable access to other devices.

An integrated circuit (IC) typically includes multiple packages interconnected in layers. Each package, in turn, may include multiple layers (also referred to as "planes"). Packages within a single IC may be composed of varying materials having varying electrical properties. Individual signal nets (also referred to herein simply as "nets") in the IC may be distributed across multiple packages.

Package design refers to the design of these packages (substrates). As with IC design more generally, various tools exist for automating aspects of package design. For example, design engineers typically use sophisticated Electronic Design Automation (EDA) tools to convert packaging method and process algorithms directly into circuit structures. Such tools typically provide a graphical user interface through which package designers can visually design the IC package in three dimensions.

SUMMARY

Embodiments of the present invention are directed to a computer-implemented method for checking metal coverage in a laminate structure. A non-limiting example of the computer-implemented method includes receiving, by a processor, metal shadowing rules and a semiconductor package design comprising a plurality of laminate layers, a plurality of metal power shapes, and a plurality of signal lines. Each metal power shape is mapped to one or more cells in a two-dimensional array. The metal power shapes are checked against the signal lines for compliance with the metal shadowing rules. A list of signal lines which did not satisfy the metal shadowing rules is displayed on a user interface.

Embodiments of the present invention are directed to a system for checking metal coverage in a laminate structure. A non-limiting example of the system includes a processor configured to receive metal shadowing rules. The processor also receives a semiconductor package design including a plurality of laminate layers, a plurality of metal power shapes, and a plurality of signal lines. Each metal power shape is mapped to one or more cells in a two-dimensional array. The metal power shapes are checked against the signal lines for compliance with the metal shadowing rules. A list of signal lines which did not satisfy the metal shadowing rules is displayed on a user interface.

Embodiments of the present invention are directed to a computer program product for checking metal coverage in a laminate structure. A non-limiting example of the computer program product includes program instructions executable by a processor to cause the processor to receive metal shadowing rules and a semiconductor package design comprising a plurality of laminate layers, a plurality of metal power shapes, and a plurality of signal lines. Each metal power shape is mapped to one or more cells in a two-dimensional array. The metal power shapes are checked against the signal lines for compliance with the metal shadowing rules. A list of signal lines which did not satisfy the metal shadowing rules is displayed on a user interface.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
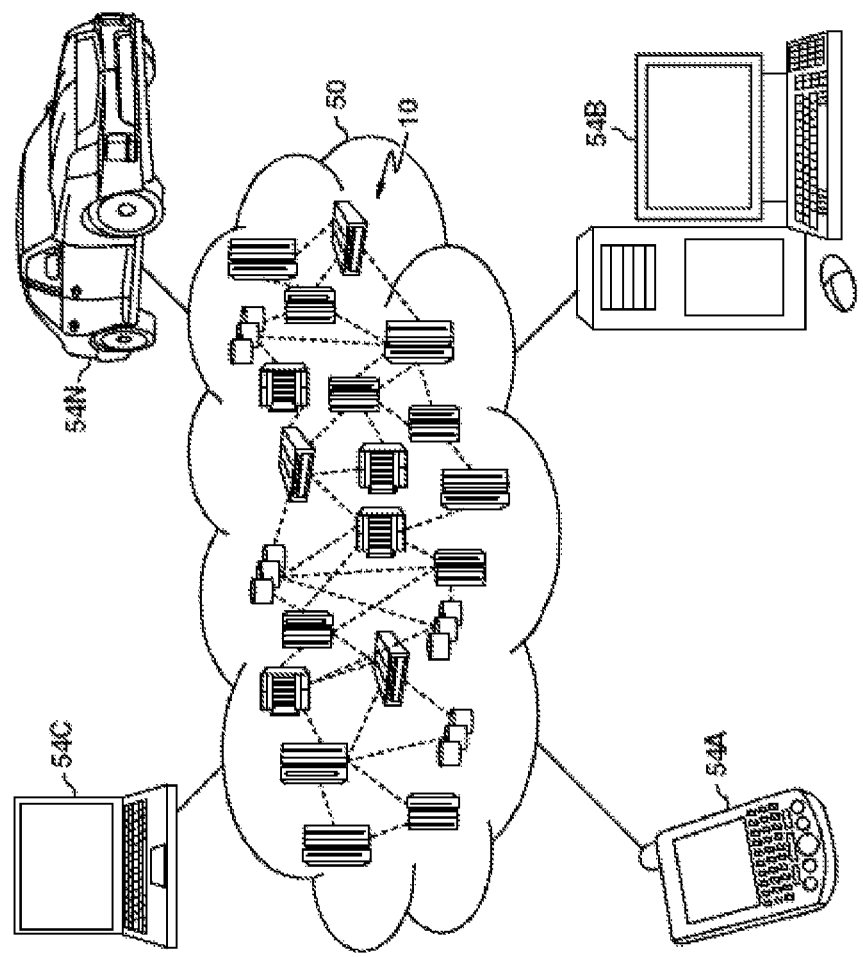
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
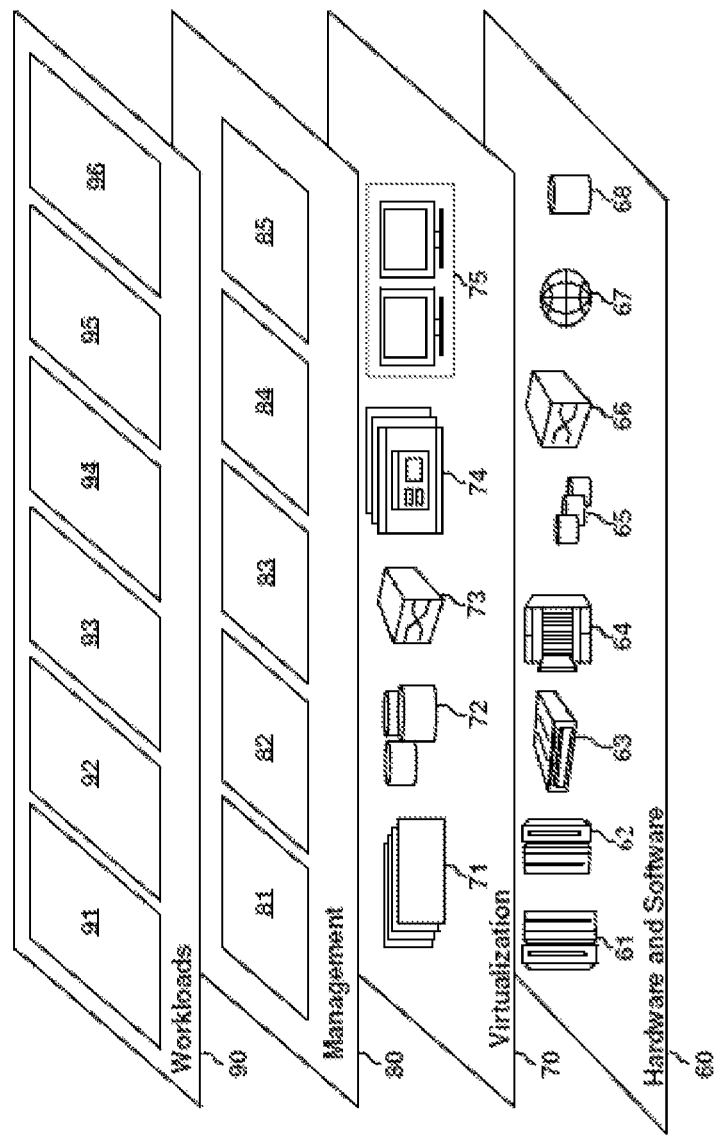
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and semiconductor package metal shadowing checks 96.

Figure 3:
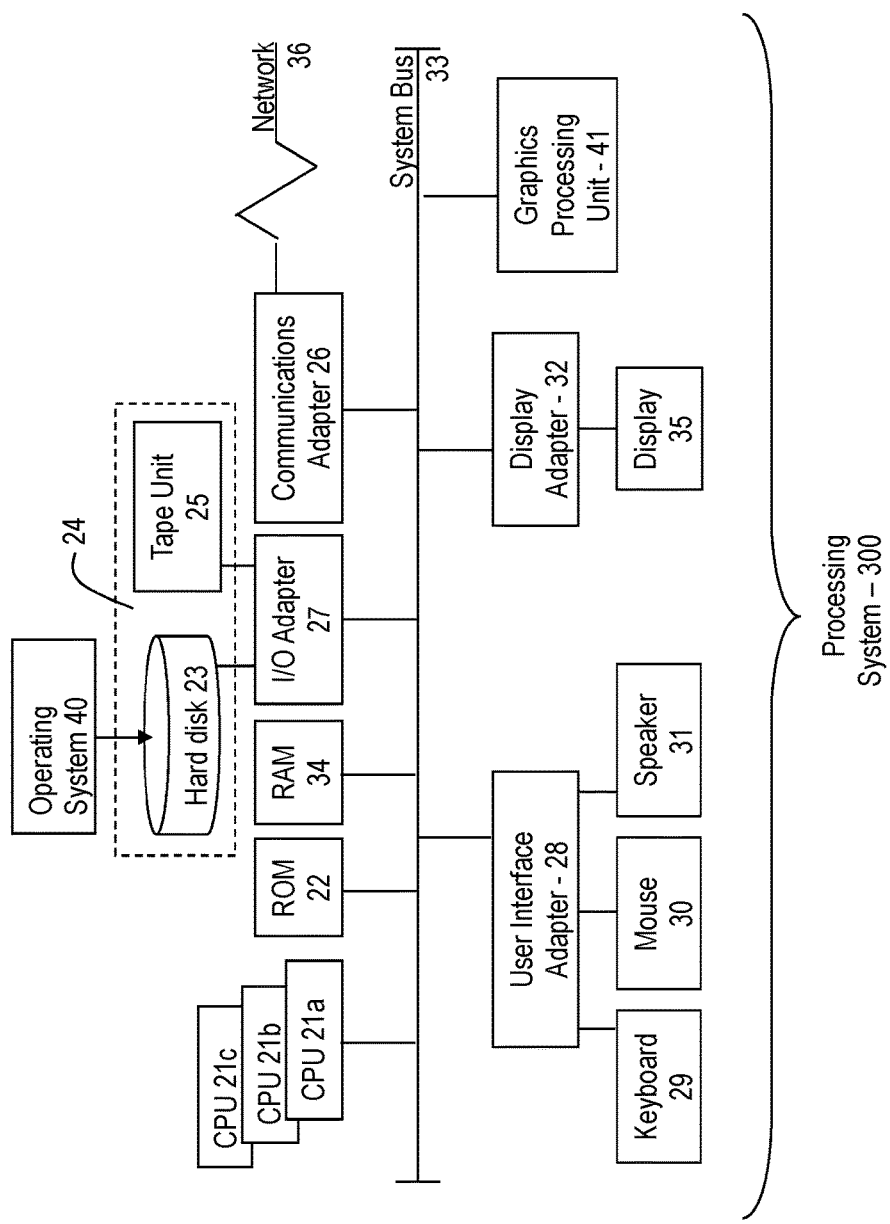
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the present invention, as previously noted herein, design engineers typically use sophisticated EDA tools to design IC packaging. Once a potential package is designed, package designers ensure that the package satisfies manufacturability and functionality requirements. Design Rule Checking or Check(s) (DRC) refers to an EDA determination as to whether a particular chip design satisfies a series of recommended parameters called Design Rules (also known as ground rules). The main objective of DRC is to achieve a high overall yield and reliability for the package design. If design rules are violated, the design may not be functional.

Currently available package design tools such as EDA with DRC are somewhat limited. For example, there exist package design rules for minimum metal coverage and overlap distances above or below a signal line in a semiconductor package (also known as shadowing rules or three-dimensional metal adjacency requirements). A minimum allowed metal coverage and overlap for each signal line is necessary to prevent cracking in the package laminate. Conventional EDA tools with DRC capability cannot automatically check if the metal coverage or overlap in a vertical direction away from the core or middle layer of a package design for a specific signal line is in compliance with these shadowing rules. Instead, conventional tools are limited to checking single layers immediately above or below a signal line. As a result, a human package designer must typically manually verify that the metal coverage and overlap for each signal line satisfies the shadowing rules. This is a tedious, time-consuming, and error-prone process.

Turning now to an overview of the aspects of the invention, one or more embodiments of the invention address the above-described shortcomings of the prior art by providing methods, systems, and computer program products for semiconductor package metal shadowing checks. Aspects of the invention serve to optimize the verification of metal coverage and overlap across all layers of a semiconductor package design to greatly improve package verification efficiency and to reduce the errors associated with the manual checking of shadowing rules.

Aspects of the invention include receiving metal shadowing rules and a semiconductor package design. The package design includes one or more laminate layers as well as various signal lines and metal power shapes distributed on each of the laminate layers. Each metal power shape located on a given laminate layer is mapped to one or more cells in a two-dimensional array. Each cell of the two-dimensional array includes a 32 digit binary number and each digit in the 32 digit binary number corresponds to a unique location (i.e., vertical and horizontal coordinates) on the laminate layer. Advantageously, the presence, or absence, of a metal power shape at a particular location on a laminate layer can be easily verified by (1) reading the cell corresponding to the location (i.e., matching the vertical coordinates) and (2) reading the value of the binary digit in that cell that maps to the location (i.e., matching the horizontal coordinates).

Aspects of the invention include determining, for each signal line, whether the metal power shapes satisfy the metal shadowing rules and displaying on a user interface a list of signal lines that do not satisfy the metal shadowing rules. In this manner, a simplified, automatic process is provided for semiconductor package metal shadowing checks. Advantageously, compliance with the metal shadowing rules is checked across multiple laminate layers for each signal line in a vertical direction away from the core or middle layer.

The above-described aspects of the invention address the shortcomings of the prior art by providing a package design tool that can automatically check both top-side and bottom-side signal lines against all package layers above, or below, respectively, for compliance with the shadowing rules. A "top-side" signal line refers to a signal line formed in a top-side layer of a laminate stack (i.e., over the core or middle layer) and a "bottom-side" signal line refers to a signal line formed in a bottom-side layer of a laminate stack (i.e., under the core or middle layer). In other words, the package design tool is capable of looking beyond the adjacent layers to check the entire relevant laminate stack above or below a given signal line for compliance (i.e., metal coverage and overlap is checked on layers above a top-side signal line and on layers below a bottom-side signal line). An error is reported only when sufficient coverage or overlap is missing throughout the entire relevant laminate stack. Consequently, false error reports are avoided when sufficient coverage or overlap does not exist on the most adjacent layers but is instead provided for in more remote layers of the laminate stack (e.g., 2, 3, 4, 5, 6, 7, or more layers removed).

Figure 4:
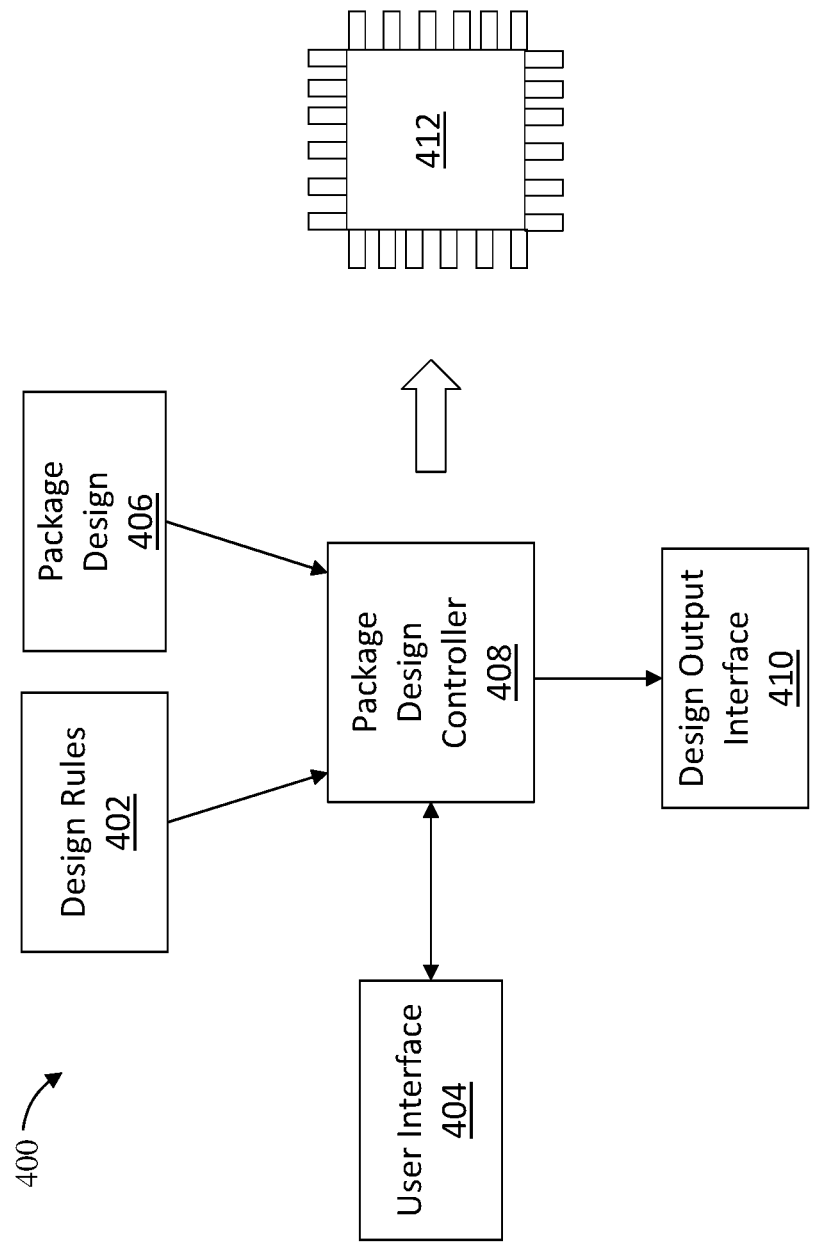
FIG. 4 depicts a block diagram of a system for semiconductor package metal shadowing checks according to one or more embodiments of the present invention.

Turning now to a more detailed description of aspects of the present invention, FIG. 4 depicts a system 400 for designing and checking semiconductor package metal shadowing rules and the resulting physical implementation of a semiconductor package 412 according to one or more embodiments of the present invention. The system 400 includes a design rules database 402, a user interface 404, a package design database 406, a package design controller 408, and a design output interface 410. In one or more embodiments of the invention, the package design controller 408 can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein. In some embodiments of the present invention, the package design controller 408 is used to physically implement a semiconductor package or integrated circuit that satisfies the design rules 402 and the system 400 includes the resulting physical implementation of the semiconductor package 412. Once the semiconductor package 412 has been designed or otherwise modified to satisfy the design rules 402, the semiconductor package 412 can be physically implemented using known semiconductor package or integrated circuit fabrication techniques.

In one or more embodiments of the invention, the package design controller 408 is configured to receive design rules from the design rules database 402, a package design from the package design database 406, and a package designer's (user's) input from the user interface 404. In some embodiments of the present invention, a user can input additional or custom design rules into the package design controller 408 which can supplement or replace the design rules stored in the design rules database 402. The package design can be loaded from the package design database 406 or provided by the user using the user interface 404. In some embodiments of the present invention, the user can build up a new package design using the user interface 404.

The package design includes a description of all of the features of a particular package. In some embodiments of the present invention, the package design includes a list of all package layers, the dimensions of each layer, the location and dimensions of all chips within the package, the location and dimensions of all signal lines within the package, the location and dimensions of all power shapes within the package, the coordinates of all via stacks within the package, and, for each via stack, the starting and ending layer of the via stack, the diameter of the via stack at each layer, and a unique identifier for each via stack. It is understood that these parameters are exemplary and that a package design can include additional or different elements.

The design rules include shadowing rules or constraints for three-dimensional metal coverage and overlap in a semiconductor package or PCB. For example, a first design rule can state that each signal line must have complete metal coverage towards the nearest surface (i.e., in the laminate stack above a top-side signal line or in the laminate stack below a bottom-side signal line). A second design rule can define a minimum single layer overlap distance between a power shape and a signal line. A specific power shape must satisfy this minimum overlap with respect to a given signal line to count towards the metal coverage of the signal line. A third design rule can define a minimum multiple layer overlap distance between power shapes when several power shapes overlap the same portion of a signal line. It is understood that these design rules are merely exemplary and that other design rules having various complexities are possible.

The package design controller 408 receives the design rules from the design rules database 402 and/or the user interface 404 and the package design from the package design database 406 and/or the user interface 404. The package design controller 408 then checks the design rules against the package design using a metal shadowing checking process according to one or more embodiments of the present invention.

Coverage Checking

To begin coverage checking, the package design controller 408 compresses each layer of the package design into a two dimensional (2-D) array of pixels. A coordinate system having an origin (0,0) located at, for example, the bottom left corner of the layers are used to provide a reference frame for the pixel locations. An arbitrary pixel size can be provided by a user or a default size can be provided by the package design controller 408. For example, a 64 micron by 64 micron package layer can be mapped into a 2-D array of 2 micron by 2 micron pixels. In some embodiments of the present invention, each cell of the 2-D array includes a 32 digit binary number (described herein as a 32-bit number). The value of each digit of each of the 32-bit numbers corresponds to a single "pixel" in a laminate layer. In this manner, the 2-D array includes a unique binary value for each 2 micron by 2 micron pixel of the package design.

Continuing the previous example, a 64 micron by 64 micron package layer can be mapped into a 2-D array having 32 cells, each cell holding a 32-bit number. It is understood that these parameters are exemplary and that any package design having any dimensions (i.e., 100 mm by 100 mm, 32 microns by 32 microns, etc.) can be similarly compressed into a grid of pixels. Moreover, it is understood that the size of these pixels can be adjusted to increase or decrease the accuracy of the mapping (i.e., 1 micron by 1 micron pixels can be used to increase accuracy while 5 micron by 5 micron pixels can be used to decrease accuracy). Further, it is not necessary that the layers or pixels be perfectly square (i.e., a 100 mm by 60 mm layer can be mapped into 5 micron by 3 micron pixels).

Figure 5:
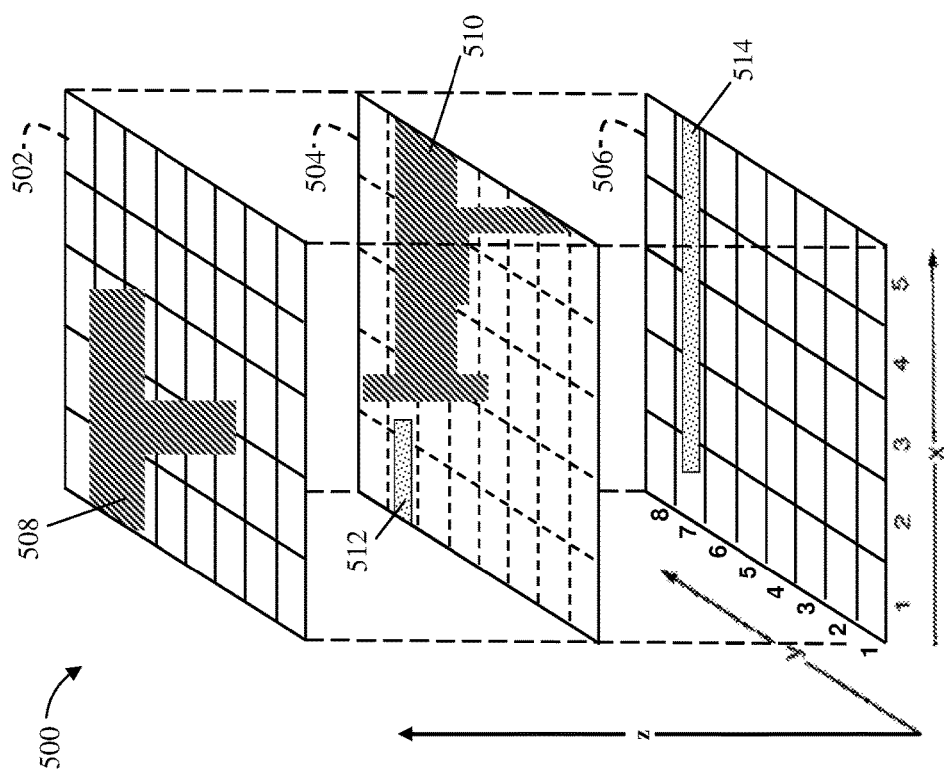
FIG. 5 depicts an illustrative example of a package design according to one or more embodiments of the present invention.

Once a 2-D array having a defined pixel size is provided according to one or more embodiments of the present invention, the package design controller 408 maps all of the design power shapes for a first laminate layer of the package design into one or more cells in a first 2-D array (the power shape array). The first laminate layer can be, for example, a topmost or bottommost layer of the package design. In some embodiments of the present invention, the first laminate layer is the topmost layer of the laminate stack. An exemplary package design is depicted in FIG. 5. For a 2 micron by 2 micron pixel size, for example, the package design controller 408 fills the power shape array with power shapes rounded to 2-micron intervals by exhaustively setting the value of all binary digits in each of the cells in the power shape array to "0" or "1," where "1" indicates the presence of a power shape in the corresponding pixel.

The package design controller 408 then maps all of the signal lines on a second laminate layer of the package design into one or more cells in a first signal line array. In some embodiments of the present invention, the second laminate layer is the next adjacent laminate layer in a vertical direction towards the core. The signal lines can be mapped in a manner similar to that used for the power shapes. In some embodiments of the present invention, the package design controller 408 exhaustively sets the value of all binary digits in each of the cells in the first signal line array to "0" or "1," where "1" indicates the presence of a signal line in the corresponding pixel.

The package design controller 408 checks each pixel indicating a signal line in the first signal line array (i.e., each pixel corresponding to a value of "1" in the first signal line array) against the power shape array. As discussed previously herein, the first signal line array and power shape array are formed using the same mapping and pixel size. Accordingly, a given pixel stored in a particular binary number in the first signal line array corresponds to the same physical location as a pixel stored in the same relative binary number in the power shape array (i.e., the $4^{th}$ binary digit in the first cell of the first signal line array and the $4^{th}$ binary digit in the first cell of the power shape array correspond to the exact same 2 micron by 2 micron area of the laminate). Consequently, checking the first signal line array against the power shape array is greatly simplified. For each "1" stored in the first signal line array, the package design controller 408 reads the value of the equivalent binary digit stored in the power shape array. An error can be reported by the package design controller 408 if the equivalent binary digit stored in the power shape array has a value of "0."

The power shapes on the second laminate layer are then located and added to the power shapes already stored in the power shape array. In some embodiments of the present invention, the power shapes are mapped to 2-micron intervals in a similar manner to the power shapes in the first laminate layer. Any suitable means can be used to add the power shapes on the second laminate layer to those already stored in the power shape array. In some embodiments of the present invention, the power shapes on the second laminate layer are added to those already stored in the power shape array using a bit shifting algorithm. For example, assume that the 32-bit value of a particular cell after mapping the power shapes on the first laminate layer is (01100 . . . 10000). A power shape in a pixel corresponding to the second to last binary digit of the cell can be inserted into this 32-bit value by bit shifting the value "1" a single time (i.e., 00000 . . . 00010) and using the OR operator on the original value (i.e., 01100 . . . 10000). The result is a 32-bit value equal to (01100 . . . 10010). This process can be repeated for every pixel in the second laminate layer to effectively union (or merge) the power shapes in the first and second laminate layers into a single power shape array.

The package design controller 408 then maps all of the signal lines on a third laminate layer of the package design into one or more cells in a second signal line array. In some embodiments of the present invention, the third laminate layer is the next adjacent laminate layer in a vertical direction towards the core. The signal lines of the second signal line array can be mapped in a manner similar to that used for first signal line array. In some embodiments of the present invention, the package design controller 408 exhaustively sets the value of all binary digits in each of the cells in the second signal line array to "0" or "1," where "1" indicates the presence of a signal line in the corresponding pixel.

The package design controller 408 then checks each pixel indicating a signal line in the second signal line array (i.e., each pixel corresponding to a value of "1" in the signal line array) against the power shape array. As discussed previously herein, the power shape array is updated to include power shapes for all previously mapped laminate layers (i.e., power shapes from both the first and second laminate layers). In this manner, the package design controller 408 will automatically consider all valid power shapes for all valid laminate layers (i.e., for a top-side signal line all power shapes above the signal line will be included in the 2-D array prior to checking the signal line's validity).

This process (map power shapes for layer n to a power shape array; map signal lines for layer n−1 to a unique signal lines array and check against the power shape array; map power shapes for layer n−1 and update the power shape array; map signal lines for layer n−2 to a new signal lines array and check against the power shape array; etc.) repeats for progressive laminate layers until the middle or core layer of the laminate is reached. The process then starts over on the opposite side of the laminate and works back towards the core from the opposite side (i.e., if the process started at the topmost layer of the laminate and progressed down to the core layer, the process stops and then starts over from the bottommost layer of the laminate wherein the process will continue up towards the core). In some embodiments of the present invention, existing power shapes in the power shape array are cleared before starting over on the opposite side of the laminate. In this manner, the package design controller 408 exhaustively validates every signal line for compliance with the shadowing rules. Moreover, the package design controller 408 correctly accounts for top-side vs bottom-side signal line compliance.

Any suitable scanline process can be used by the package design controller 408 to identify the design power shapes and signal lines for mapping into the 2-D arrays. In some embodiments of the present invention, the package design controller 408 receives a text-based list of all shapes, edges, lines, circles, and arcs in the package design. Assuming horizontal scanlines, horizontal lines edges can be ignored. Similarly, vertical edges can be ignored for vertical scanlines. The package design controller 408 can determine if a given pixel is within a particular shape by taking the vertical position (y value) of the pixel and scanning across (for all x values less than the x value of the pixel) the package layer for x intercepts having an edge. In some embodiments of the present invention, the package design controller 408 keeps track of the x intercepts having an edge and calculates the total number of x intercepts having an edge for a given pixel. The pixel is inside a shape if the number of these intercepts mod 2 is equal to 1.

Overlap Checking

Overlap checking can be validated by the package design controller 408 in tandem with or separate from the Coverage Checking operations already described above with respect to one or more embodiments of the present invention. Overlap checking supplements the coverage design rules by requiring that a defined overlap distance is satisfied for valid power shapes in addition to strict coverage. As discussed previously herein, the design rules can define a minimum single layer overlap distance "p" between a power shape and a signal line and a multiple layer overlap distance "q" between multiple power shapes covering a single signal line. A specific power shape must satisfy these overlap rules with respect to a given signal line to count towards the metal coverage of the signal line.

In some embodiments of the present invention, a 2 micron single layer signal line-power shape overlap rule and a 6 micron multiple layer power shape-power shape overlap rule are defined. It is understood that these rules are exemplary and that any distance, including partial micron distances, can be defined. The package design controller 408 exhaustively validates each of these overlap rules with respect to each signal line in the design package in a similar manner as the coverage rules. In some embodiments of the present invention, the package design controller 408 progressively checks each pixel of a given signal line for compliance with the overlap rules.

In some embodiments of the present invention, the package design controller 408 identifies all pixels corresponding to an edge of a given signal line and overlap compliance is only checked for those edge pixels to increase efficiency. In some embodiments of the present invention, overlap compliance for a given edge pixel is checked for a particular power shape by progressively validating the value of the binary digits stored in the power shape array that correspond to the pixels which extend from the edge pixels of the signal line in a direction orthogonal to the signal line (i.e., a single 2 micron pixel is checked for a 2 micron overlap rule and three pixels are checked for a 6 micron overlap rule). In some embodiments of the present invention, the package design controller 408 pre-shrinks all power shapes radially by q/2 (i.e., by half the value of the multiple layer overlap distance q) and pre-shrinks all signal lines by q/2−p (i.e., by the difference between q/2 and p). The pre-shrunk power shapes and signal lines are stored as modified shapes by the package design controller 408. Advantageously, validating the overlap rules for these pre-shrunk shapes is simplified. The package design controller 408 checks each of the modified signal lines against the union of all modified power shapes located above (for a top-side signal line) or below (for a bottom-side signal line). Any areas remaining after subtracting the union of these modified power shapes from the modified signal line do not satisfy the overlap rules.

FIG. 5 depicts an illustrative example of a package design 500 according to one or more embodiments of the invention. The package design 500 can be input into the package design controller 408 described herein for semiconductor package metal shadowing checks. In some embodiments of the present invention, the package design 500 includes layers 502, 504, and 506 vertically stacked in a direction z. These layers are merely illustrative and additional layers can be provided above and below those depicted. Moreover, the package design 500 is depicted with condensed x-y coordinates for each pixel for ease of illustration. It is understood that the full size package design 500 includes the true, uncompressed location and dimensions for each signal line and power shape and that each pixel corresponds to an actual physical location according to one or more embodiments of the present invention.

As depicted, power shape 508 is distributed throughout the layer 502. Similarly, power shape 510 is distributed throughout the layer 504. A signal line 512 partially traverses the layer 504 and a signal line 514 partially traverses the layer 506. These power shapes and signal lines are merely illustrative. The package design 500 can include different or additional power shapes and signal lines. It is understood that the package design 500 overall is merely exemplary and that other, more complicated package designs having a plurality of additional layers, power shapes, signal lines, and chips (not illustrated) are contemplated. Assuming that the layer 502 is the topmost layer of the package design 500, the package design controller 408 (depicted in FIG. 4) will validate the signal line 512 against the power shape 508 in the layer 502 (i.e., in the layer above), according to one or more embodiments of the present invention. Similarly, the package design controller 408 will validate the signal line 514 against the power shapes 508 and 510 according to one or more embodiments of the present invention.

Figure 6:
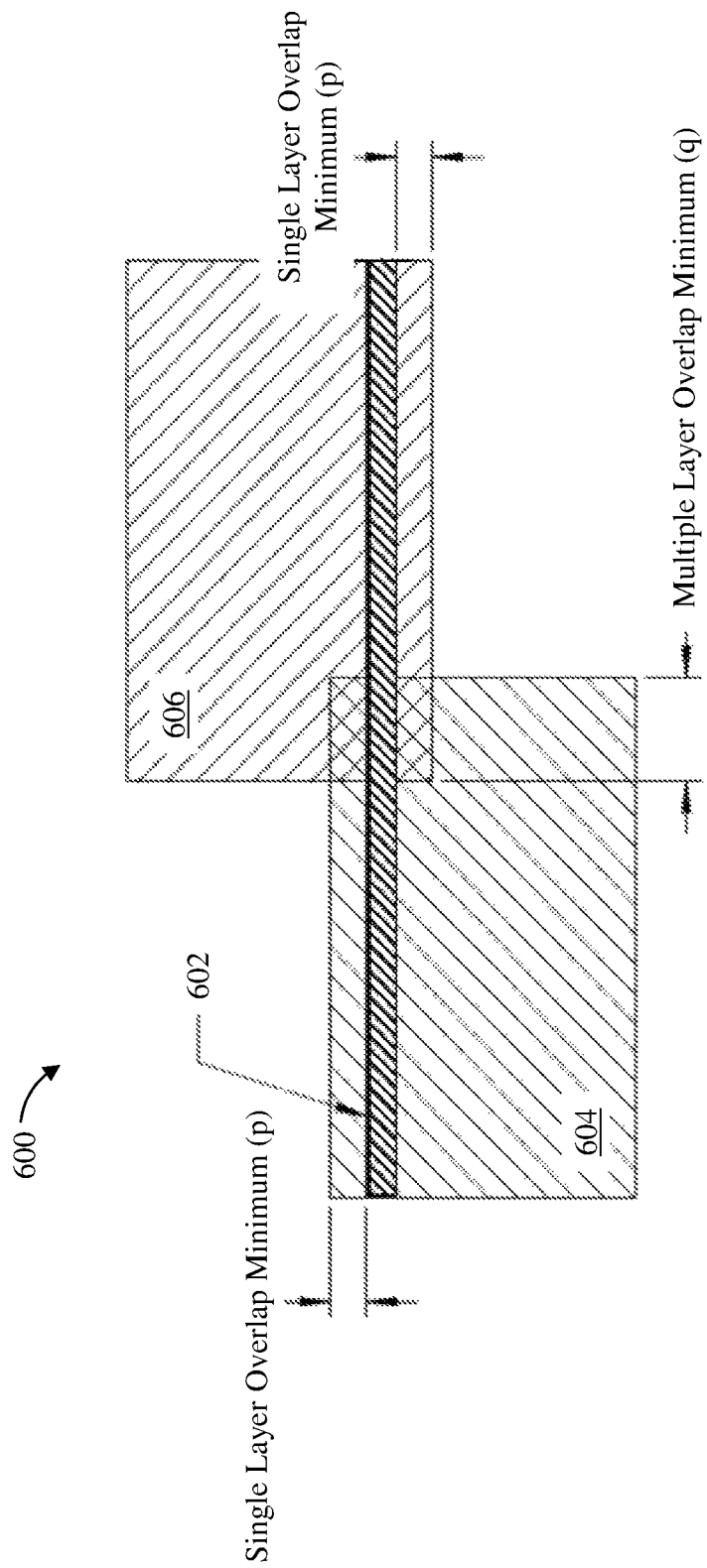
FIG. 6 depicts an illustrative example of an overlap rule according to one or more embodiments of the invention.

FIG. 6 depicts an illustrative example of an overlap rule 600 according to one or more embodiments of the invention. The overlap rule 600 includes a single layer overlap minimum "p" and a multiple layer overlap minimum "q." As depicted, the power shapes 604 and 606 each satisfy the single layer overlap distance "p" for both edges of the signal line 602. Moreover, the overlap between the power shapes 604 and 606 satisfies the multiple-layer overlap distance "q." Consequently, the power shapes 604 and 606 are included within the list of available valid power shapes for the signal line 602. Accordingly, the overlap rule 600 is satisfied for the signal line 602.

Figure 7:
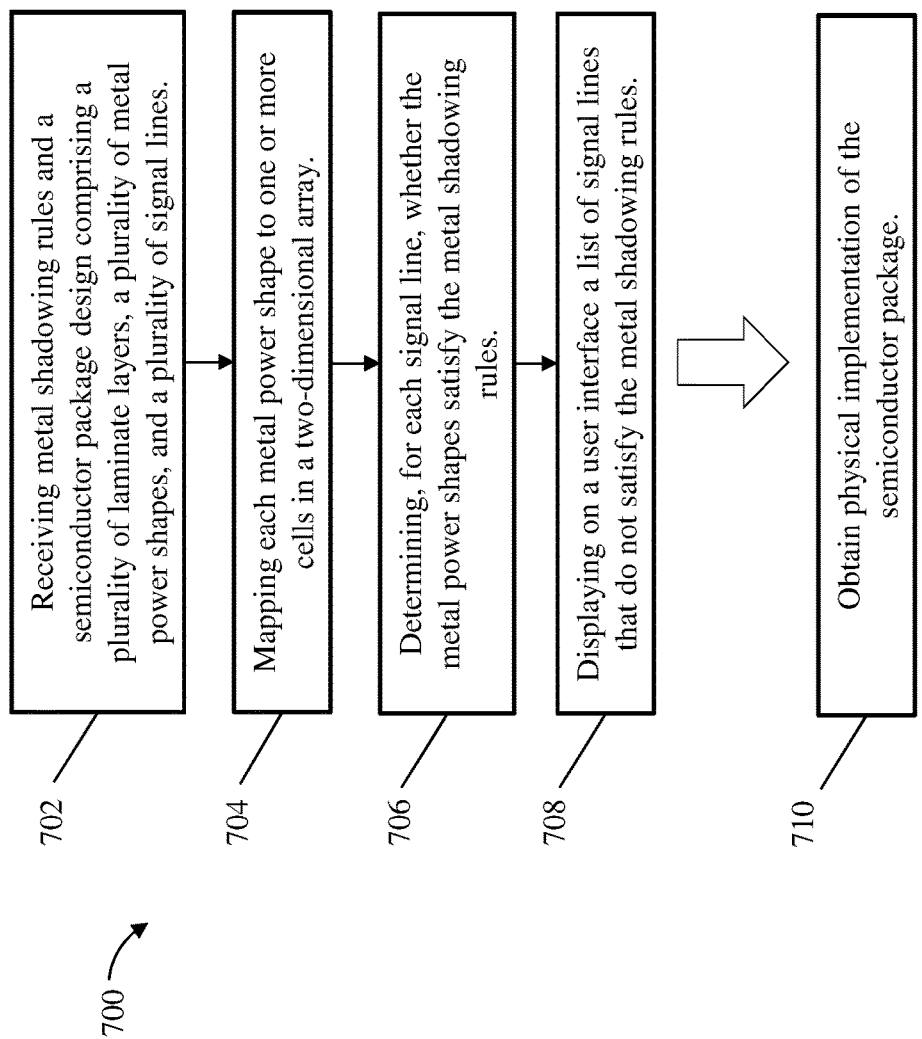
FIG. 7 depicts a flow diagram of a method for semiconductor package metal shadowing checks according to one or more embodiments of the invention.

FIG. 7 depicts a flow diagram of a method for semiconductor package metal shadowing checks according to one or more embodiments of the invention. The method 700 includes receiving metal shadowing rules and a semiconductor package design comprising a plurality of laminate layers, a plurality of metal power shapes, and a plurality of signal lines, as shown at block 702. At block 704, the method 700 includes mapping each metal power shape to one or more cells in a two-dimensional array. The method 700 further includes determining, for each signal line, whether the metal power shapes satisfy the metal shadowing rules, at block 706. The method 700 also includes displaying on a user interface a list of signal lines that do not satisfy the metal shadowing rules, as shown at block 708. As discussed previously herein, the semiconductor package design can be designed or modified to satisfy the metal shadowing rules. Subsequently, obtaining the physical implementation of a semiconductor package which satisfies the metal shadowing rules is performed at block 710.

Additional processes may also be included. It should be understood that the processes depicted in FIG. 7 represent illustrations and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for checking metal coverage in a laminate structure, the method comprising:
   receiving, by a processor, metal shadowing rules and a semiconductor package design comprising a plurality of laminate layers, a plurality of metal power shapes, and a plurality of signal lines;
   mapping each metal power shape to one or more cells in a two-dimensional array;
   determining, for each signal line, whether the metal power shapes satisfy the metal shadowing rules; and
   displaying on a user interface a list of signal lines that do not satisfy the metal shadowing rules.

2. The method of claim 1, wherein the plurality of laminate layers comprises a topmost laminate layer, a core laminate layer, and a bottommost laminate layer.

3. The method of claim 2, further comprising:
   for each signal line in a laminate layer above the core laminate layer:
      mapping the signal line to one or more cells in a two-dimensional array; and
      determining whether the metal power shapes above the signal line satisfy the metal shadowing rules.

4. The method of claim 2, further comprising:
   for each signal line in a laminate layer below the core laminate layer:
      mapping the signal line to one or more cells in a two-dimensional array; and
      determining whether the metal power shapes below the signal line satisfy the metal shadowing rules.

5. The method of claim 1, wherein the metal shadowing rules comprise a single layer metal power shape-to-signal line minimum overlap distance.

6. The method of claim 5, wherein the metal shadowing rules comprise a multiple layer metal power shape-to-metal power shape minimum overlap distance.

7. The method of claim 1, wherein each cell in the two-dimensional array comprises a 32 digit binary number and each digit in the 32 digit binary number corresponds to a unique location on a laminate layer in the semiconductor package design.

8. The method of claim 7, wherein each unique location is a two micron by two micron pixel.

9. The method of claim 8, wherein mapping each metal power shape to one or more cells in a two-dimensional array comprises setting the value of all binary digits in each of the cells in the two-dimensional array to 0 or 1, wherein a value of 1 indicates a presence of a metal power shape.

10. A system for checking metal coverage in a laminate structure, the system having a processor coupled to a memory, the processor configured to:
    receive metal shadowing rules and a semiconductor package design comprising a plurality of laminate layers, a plurality of metal power shapes, and a plurality of signal lines;
    map each metal power shape to one or more cells in a two-dimensional array;
    determine, for each signal line, whether the metal power shapes satisfy the metal shadowing rules; and
    display on a user interface a list of signal lines that do not satisfy the metal shadowing rules.

11. The system of claim 10, wherein the plurality of laminate layers comprises a topmost laminate layer, a core laminate layer, and a bottommost laminate layer.

12. The system of claim 11, further comprising:
    for each signal line in a laminate layer above the core laminate layer:

map the signal line to one or more cells in a two-dimensional array; and
determine whether the metal power shapes above the signal line satisfy the metal shadowing rules.

13. The system of claim 11, further comprising:
for each signal line in a laminate layer below the core laminate layer:
map the signal line to one or more cells in a two-dimensional array; and
determine whether the metal power shapes below the signal line satisfy the metal shadowing rules.

14. The system of claim 11, wherein the metal shadowing rules comprise a single layer metal power shape-to-signal line minimum overlap distance.

15. The system of claim 14, wherein the metal shadowing rules comprise a multiple layer metal power shape-to-metal power shape minimum overlap distance.

16. A computer program product for checking metal coverage in a laminate structure, the computer program product comprising a computer readable storage medium having program instructions embodied therewith, the program instructions executable by a processor to cause the processor to:
receive metal shadowing rules and a semiconductor package design comprising a plurality of laminate layers, a plurality of metal power shapes, and a plurality of signal lines;
map each metal power shape to one or more cells in a two-dimensional array;
determine, for each signal line, whether the metal power shapes satisfy the metal shadowing rules; and
display on a user interface a list of signal lines that do not satisfy the metal shadowing rules.

17. The computer program product of claim 16, wherein each cell in the two-dimensional array comprises a 32 digit binary number and each digit in the 32 digit binary number corresponds to a unique location on a laminate layer in the semiconductor package design.

18. The computer program product of claim 17, wherein each unique location is a two micron by two micron pixel.

19. The computer program product of claim 18, wherein mapping each metal power shape to one or more cells in a two-dimensional array comprises setting the value of all binary digits in each of the cells in the two-dimensional array to 0 or 1, wherein a value of 1 indicates a presence of a metal power shape.

20. The computer program product of claim 16, wherein the plurality of laminate layers comprises a topmost laminate layer, a core laminate layer, and a bottommost laminate layer.

* * * * *